Dec. 2, 1947.     E. H. LAND     2,431,942
LIGHT-POLARIZING VIEWER FOR USE IN CONNECTION WITH STEREOSCOPIC PICTURES
Filed Feb. 24, 1945

INVENTOR.
Edwin H. Land
BY Donald L. Brown
Attorney

Patented Dec. 2, 1947

2,431,942

UNITED STATES PATENT OFFICE 2,431,942

LIGHT-POLARIZING VIEWER FOR USE IN CONNECTION WITH STEREOSCOPIC PICTURES

Edwin H. Land, Cambridge, Mass., assignor to Polaroid Corporation, Cambridge, Mass., a corporation of Delaware Application February 24, 1945, Serial No. 579,606

13 Claims. (Cl. 88—29)

This invention relates to viewing devices, and more particularly to viewing devices such as are described, in combination with theatre admission tickets, in my co-pending application Serial No. 434,567, filed March 13, 1942, (now Patent No. 2,416,528, issued February 25, 1947) for Combined ticket strip and viewing visor, of which application the present case is a continuation-in-part.

An object of the invention is to provide a viewing device for use in connection with the viewing of stereoscopic pictures projected in polarized light.

Other objects of the invention are to provide such a viewing device which comprises a plurality of light-polarizing areas, one positioned before each eye of an observer; to provide such a viewing device in which the transmission directions of the aforesaid areas are substantially at right angles to each other; to provide such a device which may be used as a viewing device from either side without alteration in the stereoscopic effect produced; to provide such a viewing device as one of a multiplicity of such devices in a strip or roll thereof; and to provide such a multiplicity of viewing devices provided therebetween with heavily perforated or scored sections which enable the viewing devices to be separated from each other.

Other objects of the invention will in part be obvious and will in part appear hereinafter.

The invention accordingly comprises an article of manufacture possessing the features, properties, and the relation of elements which will be exemplified in the article hereinafter described and the scope of the application of which will be indicated in the claims.

For a fuller understanding of the invention, reference should be had to the following detailed description, taken in connection with the accompanying drawings, wherein.

The use of plane polarized light in connection with the projection and viewing of stereoscopic images, and more particularly in connection with the projection and viewing of stereoscopic motion pictures, has heretofore been suggested. In all such processes two images are thrown upon a screen or formed thereon, one image being formed in polarized light vibrating in a predetermined direction, and the other image being formed in differently polarized light, for example in light vibrating at right angles to the direction of vibration of the polarized light carrying the first-mentioned image. The images are usually thrown on the screen in substantially superimposed relation. A person viewing the images is provided with a viewing visor or viewing glasses which are equipped with light-polarizing elements, one positioned in front of each eye of the observer. Such systems generally have been described in several previously issued United States Letters Patent and are explained in greater detail in the patent to Land and Mahler, No. 2,203,687, isued June 11, 1940, for Apparatus employing polarized light for the production of stereoscopic images. The present invention is intended for use primarily in connection with systems in which one image is formed in horizontally vibrating polarized light and the other image is formed in vertically vibrating polarized light.

Figure 1:
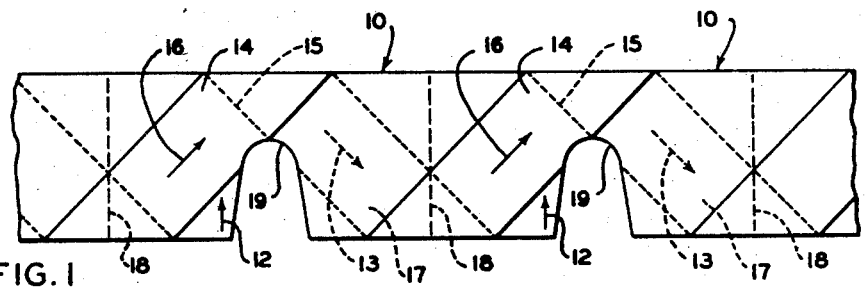
Figure 1 represents diagrammatically and in plan a portion of a strip comprising a plurality of viewing devices embodying one form of the present invention.

In Fig. 1, sheet 10 may comprise a single, fairly heavy, self-supporting strip or sheet of light-polarizing material, such for example as one of the light-polarizing materials described and claimed in United States Letters Patent Nos. 2,173,304 (Land-Rogers) and 2,237,567 (Land), the transmission axis of which may be perpendicular to its length, as shown by the arrow 12, or alternatively, in the direction of the strip length, and it may be converted to use in accordance with the invention by folding a sheet of half-wave retardation material, the principal optical direction of which is parallel with or perpendicular to its length, around said polarizing sheet, i. e. the half-wave material may be wrapped around the light-polarizing sheet, as indicated by dotted lines 15, in such manner that adjacent areas formed thereby are separated from each other by substantially the average interocular distance and with area 14 thereof lying intermediate the polarizing sheet and one eye of the observer, and with area 17 lying on the outer side of polarizing sheet 10 adjacent the other eye of the observer. The principal optical directions of the inclined areas of the half-wave retardation material will be at an angle of 90 degrees to each other and at angles of 45 degrees to the transmission axis of the polarizing sheet, as indicated by arrows 13 and 16 in Fig. 1.

The polarizing sheet 10 and the half-wave retardation sheet 14, 17 may be formed of materials which may be readily bonded together as by the use of a common solvent. For example, the polarizing sheet may comprise a suspension of polarizing particles in cellulose acetate and the retardation sheet may comprise cellulose acetate also. Other materials equally useful will be known to those skilled in the art.

Polarizing sheet 10 is preferably pre-sheeted so that when the half-wave sheet is bonded thereto, there is centrally disposed between areas 14 and 17, and adjacent one edge of the viewing device, an aperture which is adapted to fit over the nose of a person using the device, as shown for example at 19 in Fig. 1.

The viewing devices may be separated from each other by tearing along the heavily scored lines 18 so as to provide a series of successive viewing devices. It will be understood, moreover, that nose aperture 19 may be of any desired shape besides that shown and that, if desired, polarizing sheet 10 may be cut to the same shape as half-wave sheet 14, 17.

It will be understood that in the operation of the device shown in Fig. 1, the half-wave strip which lies on the outer side of sheet 10 acts in conjunction with that sheet to provide an area which will block plane polarized light vibrating in a direction which is transmitted by the portion of the device in which the half-wave strip lies intermediate the polarizing sheet and the eyes of the observer. This latter half-wave element has no effect upon the function of the device other than to serve as the means for making the device operative from either side.

Figure 2:
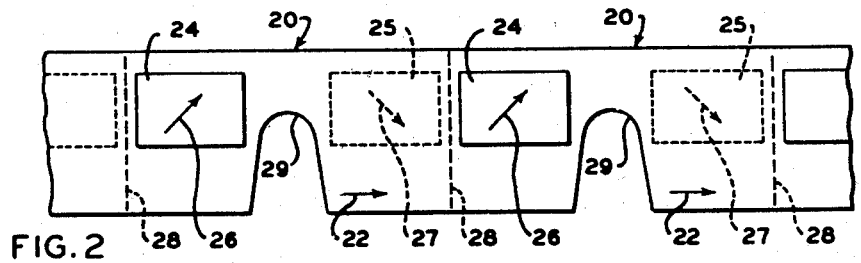
Fig. 2 is a similar view of a portion of a strip comprising a plurality of viewing devices embodying a different form of the invention.

In Fig. 2, sheet 20 may be assumed to be a sheet of light-polarizing material, the axis of which may be parallel with its length, as indicated by arrow 22, or perpendicular thereto, and it may be converted to use in accordance with the invention by bonding a single piece of half-wave retardation material, for example half-wave device 24, the principal optical direction of which is at an angle of 45 degrees to its length, as indicated by arrows 26, to one of the two eye portions in each viewer section in such manner that its principal optical direction is at an angle of substantially 45 degrees to the axis of the polarizing material. The device may be made operative from either side by bonding a similar single piece of half-wave retardation material, for example half-wave device 25, the principal optical direction of which is perpendicular to that of device 24, as indicated by arrow 27, to the other of the two eye portions but on the surface of polarizing sheet 20 opposite that on which half-wave device 24 is positioned. When such an embodiment is in use, it will be understood that the half-wave material intermediate the polarizing sheet and the eyes of the user will have no effect upon the function of the device other than to serve as the means for making the viewing device operative from either side.

Half-wave elements 24 and 25 may be bonded to polarizing sheet 20 in the same manner as the half-wave sheet is secured to the polarizing sheet in Fig. 1, i. e. by the application of a suitable common solvent to the surfaces of the polarizing sheet and half-wave elements which are in contact.

The viewing devices may be separated from each other similarly to the viewing devices described in connection with Fig. 1, i. e. by tearing along the heavy score lines 28 in Fig. 2.

Nose aperture 29 corresponds to that indicated at 19 in Fig. 1. It will be understood, moreover, that it may be of any desired shape besides that shown.

Figure 3:
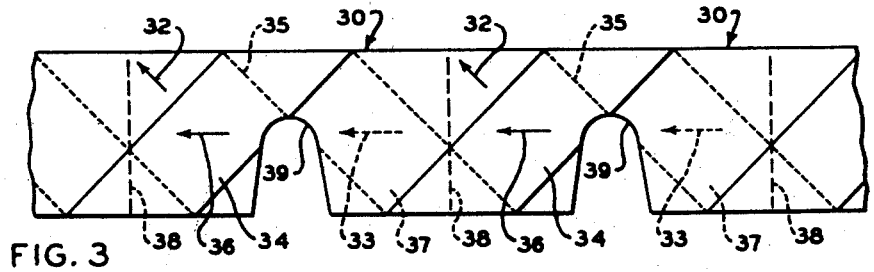
Fig. 3 is a view, similar to Fig. 1, of a further modification of the invention.

In another embodiment of the invention, as illustrated in Fig. 3, sheet 30 may be assumed to be a sheet of transparent half-wave retardation material, the principal optical direction of which is at an angle of 45 degrees to the length thereof, as indicated by arrow 32. A sheet of light-polarizing material 34, 37, the axis of which is also at an angle of 45 degrees to its length, as indicated by arrows 33 and 36, may be wrapped around the half-wave sheet in the same manner that sheet 14, 17 is wrapped around sheet 10 in Fig. 1, as indicated by dotted lines 35 in Fig. 3, so that the axis of each inclined polarizing area is at an angle of 45 degrees to the principal optical direction of half-wave sheet 30.

The strip of half-wave material 30 is preferably pre-sheeted so that when the polarizing sheet is bonded thereto, there is centrally disposed between polarizing portions 34 and 37, and adjacent one edge of the viewing device, an aperture similar to 19 in Fig. 1, which is adapted to fit over the nose of a person using the device, as shown for example at 39 in Fig. 3.

Polarizer 34, 37 may be bonded to half-wave sheet 30 in the same manner that the polarizing and half-wave elements are bonded to each other in Figs. 1 and 2, i. e. by applying a common solvent to the surfaces of the elements which are in contact.

Heavy score lines 38 in Fig. 3 are the equivalent of 18 and 28 in Figs. 1 and 2, respectively, and are the means by which the viewing devices are separated from each other.

Nose aperture 39 is similar to 19 and 29 in Figs. 1 and 2, respectively, although it is to be understood that it may be of any shape and that, if desired, half-wave sheet 30 may be cut to the same shape as polarizer 34, 37.

It will be apparent that in the operation of the device shown in Fig. 3, the half-wave sheet which lies on the outer side of polarizing area 34 acts in conjunction with the polarizing sheet to provide adjacent one eye of a wearer of the device means for blocking polarized light of a character transmitted by that portion of the device adjacent the other eye of the wearer, whereas that portion of the half-wave sheet lying intermediate polarizing area 37 and the eyes of the observer has no effect upon the function of the device, other than to make it useful as a stereo viewer from either side.

Figure 4:
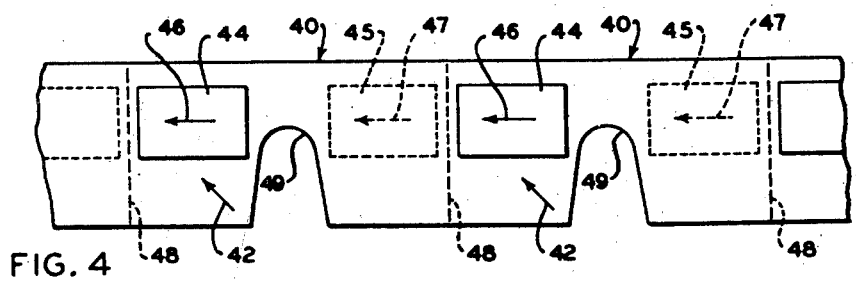
Fig. 4 is a view, similar to Fig. 2, of a still further modification of the invention.

In Fig. 4, 40 may be assumed to be a sheet of transparent half-wave retardation material, the principal optical direction of which may be at an angle of substantially 45 degrees to the length thereof, as indicated by arrows 42, and it may be converted to use in accordance with the invention by bonding a single piece of light-polarizing material, for example area 44, the transmission axis of which may be parallel with its length, as indicated by arrow 46, to one of the two eye portions in each viewer section, with the axis of said light-polarizing material at an angle of substantially 45 degrees to the principal optical direction of said half-wave sheet. The device may be made operative from either side by bonding a similar, single piece of light-polarizing material, for example area 45, the transmission axis of which is parallel to that of area 44, as indicated by arrow 47, to the other of the two eye portions but on the surface of half-wave sheet 40 opposite that on which polarizing area 44 is positioned. When such an embodiment is in use, it will be understood that that portion of half-wave sheet 46 intermediate polarizer 45 and the eye of the user will have no effect upon the function of the device other than to serve as the means for making the viewing device operative from either side.

The half-wave sheet and polarizing elements may be bonded to each other in the same way that the similar elements are bonded together in connection with the devices illustrated in Figs. 1-3, inclusive.

The viewing devices may be separated from each other by tearing along the heavy score lines 46.

Nose aperture 49 is identical with the corresponding elements in Figs. 1-3, although it should be understood that it may be of any desired shape besides that shown.

It will be noted that the viewing devices described may be employed with either surface adjacent the eyes of the observer. The entire device is light, thin, easily handled, easily assembled, and cheap. There is no need to instruct the user as to how the device is to be handled, or how it is to be used, whereas with devices of the same general type that have heretofore been employed it is possible for the observer to look through the devices from one surface only without losing the stereoscopic effect which is desired.

It should also be understood that the general shape and form of the viewing devices may be altered as desired. In its simplest form, it may comprise a substantially straight strip, as shown in the drawings. In more complex forms, it may be shaped to represent some object which is being advertised, such for example as an automobile, in which case the areas 14 and 17 in Fig. 1, 24 and 25 in Fig. 2, 34 and 37 in Fig. 3, and 44 and 45 in Fig. 4 may be positioned to overlie the headlights of the automotive vehicle being represented. All such modifications of appearance are to be deemed to fall within the scope of the invention.

Since certain changes may be made in the above article and different embodiments of the invention could be made without departing from the scope thereof, it is intended that all matter contained in the above description or shown in the accompanying drawings shall be interpreted as illustrative and not in a limiting sense.

What is claimed is:

1. A viewing device comprising, in combination, a sheet of light-polarizing material having its transmission axis in a predetermined direction and forming a pair of viewing portions, means providing a nose recess between said portions, a half-wave retardation element superimposed upon one of said viewing portions and affixed thereto with the principal optical direction thereof substantially at 45 degrees to the transmission axis of said polarizing material, and a second half-wave retardation element superimposed upon the other of said viewing portions on the surface of said polarizing sheet opposite from said first-named half-wave element, said second-named half-wave element being positioned with its principal optical direction substantially at 90 degrees to the principal optical direction of said first-named half-wave element, said viewing visor being characterized by the fact that either face thereof may be used as the viewing face without alteration of the steroscopic effect produced.

2. A viewing device comprising, in combination, a sheet of light-polarizing material forming a pair of viewing portions, the transmission axis of said polarizing material being substantially parallel with the length thereof, means providing a nose recess between said portions, a half-wave retardation element superimposed upon one of said viewing portions and affixed thereto with the principal optical direction thereof substantially at 45 degrees to the transmission axis of said polarizing material, and a second half-wave retardation element superimposed upon the other of said viewing portions on the surface of said polarizing sheet opposite from said first-named half-wave element, said second-named half-wave element being positioned with its principal optical direction substantially at 90 degrees to the principal optical direction of said first-named half-wave element, said viewing visor being characterized by the fact that either face thereof may be used as the viewing face without alteration of the stereoscopic effect produced.

3. A viewing device comprising, in combination, a sheet of light-polarizing material forming a pair of viewing portions, the transmission axis of said polarizing material being substantially perpendicular to the length thereof, means providing a nose recess between said portions, a half-wave retardation element superimposed upon one of said viewing portions and affixed thereto with the principal optical direction thereof substantially at 45 degrees to the transmission axis of said polarizing material, and a second half-wave retardation element superimposed upon the other of said viewing portions on the surface of said polarizing sheet opposite from said first-named half-wave element, said second-named half-wave element being positioned with its principal optical direction substantially at 90 degrees to the principal optical direction of said first-named half-wave element, said viewing visor being characterized by the fact that either face thereof may be used as the viewing face without alteration of the stereoscopic effect produced.

4. A viewing visor comprising, in combination, a sheet of half-wave retardation material having a principal optical direction forming a pair of viewing portions, a light-polarizing element superimposed upon one of said viewing portions and affixed thereto with the transmission axis thereof substantially at 45 degrees to the principal optical direction of said half-wave retardation material, and a second light-polarizing element superimposed upon and affixed to the other of said viewing portions on the surface of said half-wave retardation material opposite from said first-named light-polarizing element, said second-named light-polarizing element being positioned with its transmission axis substantially parallel with the transmission axis of said first-named light-polarizing element, said viewing visor being characterized by the fact that either face thereof may be used as the viewing face without alteration of the stereoscopic effect produced.

5. A viewing visor comprising, in combination, a sheet of half-wave retardation material forming a pair of viewing portions, the principal optical direction of said half-wave retardation material being at an angle of substantially 45 degrees to the length thereof, a light-polarizing element superimposed upon one of said viewing portions and affixed thereto with the transmission axis thereof substantially at 45 degrees to the principal optical direction of said half-wave retardation material, and a second light-polarizing element superimposed upon and affixed to the other of said viewing portions on the surface of said half-wave retardation material opposite from said first-named light-polarizing element, said second-named light-polarizing element being positioned with its transmission axis substantially parallel with the transmission axis of said first-named light-polarizing element, said viewing visor being characterized by the fact that either face thereof may be used as the viewing face without alteration of the stereoscopic effect produced.

6. A viewing visor of the character described comprising means providing two viewing portions lying in substantially a single plane and so spaced that each said portion overlies an eye of a wearer of said visor, each said viewing portion comprising a light-polarizing element and a half-wave retardation element superimposed thereupon, the transmission axes of said light-polarizing elements being parallel with each other, one of said portions having the half-wave element positioned adjacent and in front of its associated light-polarizing element, the other said portion having the half-wave element positioned adjacent and in back of its associated light-polarizing element, the half-wave element of each said portion being positioned with its principal optical direction at substantially 45 degrees to the transmission axis of the polarizing element of said portion, and each of said portions being adapted to block polarized light transmitted by the other said portion, said viewing visor being characterized by the fact that either face thereof may be used as the viewing face without alteration of the stereoscopic effect produced.

7. A viewing visor of the character described comprising means providing two viewing portions lying in substantially a single plane and so spaced that each said portion overlies an eye of a wearer of said visor, each said viewing portion comprising a light-polarizing element and a half-wave retardation element superimposed thereupon, the transmission axes of said light-polarizing elements being parallel with each other, one of the said elements forming each said portion being continuous and overlying both said portions, one of said portions having the half-wave element positioned adjacent and in front of its associated light-polarizing element, the other said portion having the half-wave element positioned adjacent and in back of its associated light-polarizing element, the half-wave element of each said portion being positioned with its principal optical direction at substantially 45 degrees to the transmission axis of the polarizing element of said portion, and each of said portions being adapted to block polarized light transmitted by the other said portion, said viewing visor being characterized by the fact that either face thereof may be used as the viewing face without alteration of the stereoscopic effect produced.

8. A viewing visor comprising, in combination, a sheet of light-polarizing material having its transmission axis in a predetermined direction and a sheet of half-wave retardation material, said half-wave sheet being superimposed upon and affixed to said light-polarizing sheet in such manner as to form therewith a pair of angularly disposed viewing portions separated from each other by substantially the average interocular distance, the half-wave material associated with one of said viewing portions being positioned adjacent and in front of said light-polarizing sheet and the half-wave material associated with the other of said viewing portions being positioned adjacent and in back of said light-polarizing sheet, the principal optical direction of the half-wave material comprising each of said viewing portions being at an angle of substantially 45 degrees to the transmission axis of the light-polarizing material associated therewith, said viewing visor being characterized by the fact that either face thereof may be used as the viewing face without alteration of the stereoscopic effect produced.

9. A viewing visor comprising, in combination, a sheet of light-polarizing material, the transmission axis of said light-polarizing material being substantially parallel with the length thereof, and a sheet of half-wave retardation material, said half-wave sheet being superimposed upon and affixed to said light-polarizing sheet in such manner as to form therewith a pair of angularly disposed viewing portions separated from each other by substantially the average interocular distance, the half-wave material associated with one of said viewing portions being positioned adjacent and in front of said light-polarizing sheet and the half-wave material associated with the other of said viewing portions being positioned adjacent and in back of said light-polarizing sheet, the principal optical direction of the half-wave material comprising each of said viewing portions being at an angle of substantially 45 degrees to the transmission axis of the light-polarizing material associated therewith, said viewing visor being characterized by the fact that either face thereof may be used as the viewing face without alteration of the stereoscopic effect produced.

10. A viewing visor comprising, in combination, a sheet of light-polarizing material, the transmission axis of said light-polarizing material being substantially perpendicular to the length thereof, and a sheet of half-wave retardation material, said half-wave sheet being superimposed upon and affixed to said light-polarizing sheet in such manner as to form therewith a pair of angularly disposed viewing portions separated from each other by substantially the average interocular distance, the half-wave material associated with one of said viewing portions being positioned adjacent and in front of said light-polarizing sheet and the half-wave material associated with the other of said viewing portions being positioned adjacent and in back of said light-polarizing sheet, the principal optical direction of the half-wave material comprising each of said viewing portions being at an angle of substantially 45 degrees to the transmission axis of the light-polarizing material associated therewith, said viewing visor being characterized by the fact that either face thereof may be used as the viewing face without alteration of the stereoscopic effect produced.

11. A viewing visor comprising, in combination, a sheet of half-wave retardation material having a principal optical direction and a sheet of light-polarizing material, said light-polarizing sheet being superimposed upon and affixed to said half-wave sheet in such manner as to form therewith a pair of angularly disposed viewing portions separated from each other by substantially the average interocular distance, the light-polarizing material associated with one of said viewing portions being positioned adjacent and in front of said half-wave sheet and the light-polarizing material associated with the other of said viewing portions being positioned adjacent and in back of said half-wave sheet, the transmission axis of the light-polarizing material comprising each of said viewing portions being at an angle of substantially 45 degrees to the principal optical direction of the half-wave material associated therewith, said viewing visor being characterized by the fact that either face thereof may be used as the viewing face without alteration of the stereoscopic effect produced.

12. A viewing visor comprising, in combination, a sheet of half-wave retardation material, the principal optical direction of said half-wave material being at an angle of substantially 45 degrees to the length thereof, and a sheet of light-polarizing material, said light-polarizing sheet being superimposed upon and affixed to said half-wave sheet in such manner as to form therewith a pair of angularly disposed viewing portions separated from each other by substantially the average interocular distance, the light-polarizing material associated with one of said viewing portions being positioned adjacent and in front of said half-wave sheet and the light-polarizing material associated with the other of said viewing portions being positioned adjacent and in back of said half-wave sheet, the transmission axis of the light-polarizing material comprising each of said viewing portions being at an angle of substantially 45 degrees to the principal optical direction of the half-wave material associated therewith, said viewing visor being characterized by the fact that either face thereof may be used as the viewing face without alteration of the stereoscopic effect produced.

13. A viewing visor comprising, in combination, a sheet of half-wave retardation material and a sheet of light-polarizing material, the transmission axis of said light-polarizing material being at an angle of substantially 45 degrees to the length thereof, said light-polarizing sheet being superimposed upon and affixed to said half-wave sheet in such manner as to form therewith a pair of angularly disposed viewing portions separated from each other by substantially the average interocular distance, the light-polarizing material associated with one of said viewing portions being positioned adjacent and in front of said half-wave sheet and the light-polarizing material associated with the other of said viewing portions being positioned adjacent and in back of said half-wave sheet, the transmission axis of the light-polarizing material comprising each of said viewing portions being at an angle of substantially 45 degrees to the principal optical direction of the half-wave material associated therewith, said viewing visor being characterized by the fact that either face thereof may be used as the viewing face without alteration of the stereoscopic effect produced.

EDWIN H. LAND.

REFERENCES CITED

The following references are of record in the file of this patent:

UNITED STATES PATENTS

| Number | Name | Date |
|---|---|---|
| 2,099,694 | Land | Nov. 23, 1937 |
| 2,102,632 | Land | Dec. 21, 1937 |
| 2,165,974 | Land | July 11, 1939 |
| 2,169,022 | Chubb | Aug. 8, 1939 |
| 2,179,286 | English | Nov. 7, 1939 |

FOREIGN PATENTS

| Number | Country | Date |
|---|---|---|
| 517,924 | Great Britain | Feb. 13, 1940 |
| 834,855 | France | Sept. 5, 1938 |
| 841,943 | France | Feb. 20, 1939 |